(12) United States Patent
Kowatari et al.

(10) Patent No.: US 9,845,051 B2
(45) Date of Patent: Dec. 19, 2017

(54) DISPLAY DEVICE FOR SELF-PROPELLED INDUSTRIAL MACHINE

(71) Applicant: HITACHI CONSTRUCTION MACHINERY CO., LTD., Tokyo (JP)

(72) Inventors: Yoichi Kowatari, Ibaraki (JP); Naokazu Oda, Ibaraki (JP); Katsuhiko Shimizu, Ibaraki (JP); Yoshihiro Inanobe, Ibaraki (JP); Hidefumi Ishimoto, Ibaraki (JP)

(73) Assignee: HITACHI CONSTRUCTION MACHINERY CO., LTD., Tokyo (JP)

( * ) Notice: Subject to any disclaimer, the term of this patent is extended or adjusted under 35 U.S.C. 154(b) by 484 days.

(21) Appl. No.: 14/400,673

(22) PCT Filed: Apr. 25, 2013

(86) PCT No.: PCT/JP2013/062204
§ 371 (c)(1),
(2) Date: Nov. 12, 2014

(87) PCT Pub. No.: WO2013/172172
PCT Pub. Date: Nov. 21, 2013

(65) Prior Publication Data
US 2015/0138360 A1 May 21, 2015

(30) Foreign Application Priority Data
May 15, 2012 (JP) .................................. 2012-111197

(51) Int. Cl.
*B60R 1/00* (2006.01)
*E02F 9/26* (2006.01)
*H04N 7/18* (2006.01)

(52) U.S. Cl.
CPC .................. *B60R 1/00* (2013.01); *E02F 9/26* (2013.01); *H04N 7/18* (2013.01); *H04N 7/181* (2013.01);
(Continued)

(58) Field of Classification Search
CPC ....................................................... B60R 1/00
(Continued)

(56) References Cited

U.S. PATENT DOCUMENTS

2012/0113261 A1* 5/2012 Satoh ........................ B60R 1/00
348/148

FOREIGN PATENT DOCUMENTS

CN 1568618 A 1/2005
CN 102163331 A 8/2011
(Continued)

*Primary Examiner* — Jeffery Williams
(74) *Attorney, Agent, or Firm* — Mattingly & Malur, PC

(57) ABSTRACT

This invention has an object to assist for traveling operation of a self-propelled industrial machine to display underneath image of the self-propelled industrial machine on a monitor of a display device mounted in a operator's cab. The display device of the self-propelled industrial machine according to the present invention is provided for a dump truck, which comprises cameras having field of view to underneath of the dump truck, a symbol image storage section to store a symbol image which is symbolized the dump truck, a superposing process section to make transparent with a predetermined transparent ratio in the symbol image as a transparent region and to superpose an image taken by the camera on the area corresponding to the transparent region as underneath image, and a monitor mounted in a cab of the dump truck for displaying the symbol image composed by the superposing process section.

9 Claims, 13 Drawing Sheets

(52) U.S. Cl.
CPC ... *B60R 2300/303* (2013.01); *B60R 2300/607* (2013.01)

(58) Field of Classification Search
USPC .......................................................... 348/148
See application file for complete search history.

(56) References Cited

FOREIGN PATENT DOCUMENTS

| | | | |
|---|---|---|---|
| JP | 2005-163370 A | 6/2005 | |
| JP | 2006-279752 A | 10/2006 | |
| JP | 2003018 A2 * | 12/2008 | ............... B60R 1/00 |
| JP | 2009-007860 A | 1/2009 | |
| JP | 2010-093567 A | 4/2010 | |
| JP | 2011-168163 A | 9/2011 | |
| JP | 2012-040907 A | 3/2012 | |
| JP | 2012040907 A * | 3/2012 | |
| JP | 2012-074929 A | 4/2012 | |

* cited by examiner

DISPLAY DEVICE FOR SELF-PROPELLED INDUSTRIAL MACHINE

FIELD OF THE INVENTION

The present invention relates to display device for self-propelled industrial machine so as to provide assistance on traveling operation of a self-propelled industrial machine, such as a dump truck, a hydraulic excavator and the like.

DESCRIPTION OF THE BACKGROUND ART

The self-propelled industrial machine works in various field of working sites. Dump truck is an example of the self-propelled industrial machine. The dump truck has a loading platform (vessel) adapted to move up and down on a vehicle body frame, the vessel is adapted to load substances such as crushed stones, earth and sand, etc. Then, the dump truck travels to a collection yard to discharge the loaded objects. Then, the dump truck goes backward and is stopped at a discharging area. After completion of discharge out of the loaded substances, the vessel is returned to the original position and the dump truck is moved forward.

Hydraulic excavator is another type of the self-propelled industrial machine. The hydraulic excavator comprises a vehicular base structure having a crawler-type or a wheel-type travelling means and an upper swiveling structure being rotatably placed on the vehicular base structure. An operation chamber (cab) is mounted on the upper swiveling structure, and a working mechanism is also provided on the upper swiveling structure, the working mechanism being composed of a boom adapted to cause derricking operation to the upper swiveling mechanism, an arm being connected in vertically rotatable manner to distal end of the boom, and a bucket for digging earth and sand.

Although an operator boarded in the cab of the self-propelled industrial machine such as the dump truck or the hydraulic excavator can be attained front view, but dead angle regions are generated on the back side, and left and right side views. Therefore, some directions may hardly be visible with the naked eye of the operator. For the assistance of facilitating recognition for the situation surroundings of the hydraulic excavator to the operator supplementary, plural number of cameras are mounted on the self-propelling industrial machine to take image around there. The images of the cameras are displayed on a monitor mounted in the cab. By so constructing, the operator can recognize to the direction hardly confirm by sight.

According to Patent Document 1, three cameras are provided at the backward and, the left and right sides of the hydraulic excavator to survey around the hydraulic excavator, the images taken from respective cameras are shown on a display as an image combined each other sequentially. Thereby, movement of an objective substance can be recognized directly by an operator. In addition, Patent Document 2 discloses backward view of an construction machine can displayed on a monitor

PRIOR ART DOCUMENT

Patent Document

Patent Document 1: JP 2009-007860 A1
Patent Document 2: JP 2005-163370 A1

SUMMARY OF THE INVENTION

Problem to be Solved by the Invention

It is important matter that image of the around the self-propelled industrial machine is displayed on a monitor disposed in a cab. Area of dead angle for the operator is resided not only in the surrounding of the self-propelled industrial machine but also at the underside thereof. The self-propelled industrial machine will be restricted to travel in a case where some obstacle resides under the self-propelled industrial machine. For example, in a case of a dump truck, the dump truck is restricted to travel after loading works of earth and sand, if an obstacle is presented under there.

Generally, as a dump truck, in addition to a normal dumper, a large scaled dump truck to be activated, is produced a wide space at the lower side thereof. Specifically, the lower side of such a heavy dump truck as having a load weight over 100 t is formed further broader space. Therefore, an obstacle may be entered into the lower portion of the dump truck. Such situation causes to limitation to the travel of the dump truck in consideration of safety. The similar situation is caused for another type of the self-propelled industrial machine such as a hydraulic excavator or the like having a lower traveling mechanism. Therefore, although it is important to grasp the situation around the self-propelled industrial machine, the operator should further pay the attention to recognize about the lower situation.

Therefore, the object of the present invention is to assist the traveling operation of the self-propelled industrial machine by displaying the monitor device provided in the cab of the self-propelled industrial machine to display the under area thereof.

Means for Solving the Problem

In order to solve the foregoing problem, according to a display device for self-propelled industrial machine which comprises, an imaging section provided on the self-propelled industrial machine having field of view including underneath of the self-propelled industrial machine; a symbol image storage section to be stored a symbol image of the self-propelled industrial machine; a superposing process section to superpose partially on the symbol image as a transparent image region corresponding to the image area taken by the imaging section for an underneath image with a predetermined transparent ratio; and a display device provided in a cab of the self-propelled industrial machine to display the superposed symbol image by the superposing process section.

In accordance with the present invention, a display device provided in a cab shows a symbol image which is symbolized the self-propelled industrial machine. In the symbol image, the underneath portion of the self-propelled industrial machine is displayed in a form of superposed as the transparent image at the region taken image by the imaging section, thus allowing to recognize the underneath situation of the self-propelled industrial machine.

Also, it can be constructed that plural number of around imaging sections directed their optical axis toward obliquely downwardly, including at least one of the underneath imaging section; a view point converting section to create bird's eye view images by being converted the view point of the images attained from respective imaging section; an image composing section for composing respective bird's eye view images disposed around the symbol image superposed by the superposing process section; and a display image creation section to create a display image composed of the composite images by the image composing section to the display device.

The bird's eye view image is created for the sake of recognition by the operator the situation around the self-propelled industrial machine. Since the foregoing imaging section includes the around imaging sections to create the bird's eye view images, the surrounding bird's eye view images can be shown around the center of the symbol image and the underneath image of the self-propelled industrial machine can be shown into the symbol image. Thereby, the operator can recognize the underneath area and surrounding area of the self-propelled industrial machine.

Further, the image composing section, in the case of not transparent or semi-transparent but not full transparent, can be processed the symbol image superposed the transparent region doubled with the underneath image.

By bringing the transparent area to be formed semi-transparent state, the contour of the self-propelling industrial machine and under image are displayed in the duplex form. By so constructing, the outline of the self-propelling industrial machine can be confirmed together with the underneath image thereof.

In addition, the image composing section may show the underneath image of the transparent area and indicates the outline of the transparent area, when the transparent area is complete transparency.

The underneath image is displayed clearly by full transparent on the transparent area of the symbol image. The situation under the self-propelled industrial machine can be recognized clearly. In addition, by plotting the outline of the transparent area, the contour of the self-propelled industrial machine can be recognized on the symbol image.

Also, the image composing section may be plotted the outline in the similar manner as of the symbol image.

By showing to display same manner between the symbol image and the outline thereof, the contour of the symbol image is adapted to be excellent visibility at the time of displaying full transparency.

Further, the image composing section may be so constructed as to judge whether or not to make transparent on the respective transparent areas based upon the operation lever for traveling of the self-propelling industrial machine.

When plural number of transparent areas are presented, there are sometimes coexisting region necessitated to be transparent and region not necessitated to be transparent according to the traveling direction of the self-propelled industrial machine. In such a case, the contour of the symbol image can be clearly recognized to be simply displayed the symbol image by bringing non-transparent state for the region not necessary to be transparent.

Effects of the Invention

According to the present invention, the symbol image symbolized the self-propelled industrial machine is shown on the monitor display provided in the cab. The operator is able to recognize the situation under area of the self-propelled industrial machine by bringing about transparent to the region corresponding to the underneath area of the self-propelled industrial machine and superposing the image of the underneath region as the transparent area.

EMBODIMENT OF THE INVENTION

Hereafter, embodiments of the present invention will be described with reference to the attached drawings. A dump truck is applied as a self-propelled industrial machine in the embodiment, but the present invention is not limited the dump truck. A hydraulic excavator is also the self-propelled industrial machine, the explanation of the hydraulic excavator will be explained hereafter. The dump truck 1 includes a rigid type and an articulated type, any type can be applied. In the embodiment, "left" means the left side view from an operator's cab, and "right" means the right side view from the operator's cab.

Figure 1:
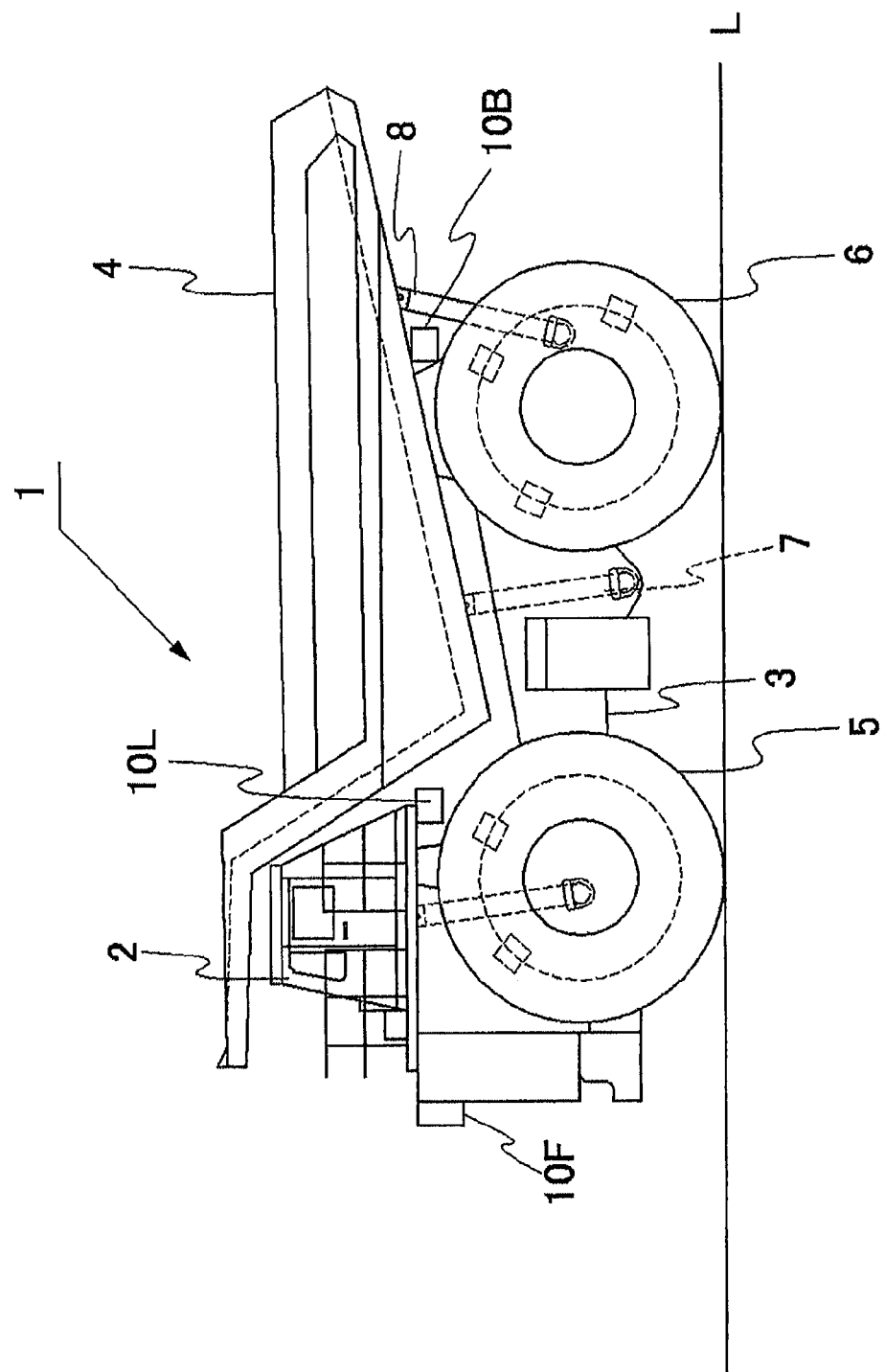
FIG. 1 is a left side elevation view of a dump truck.
Figure 2:
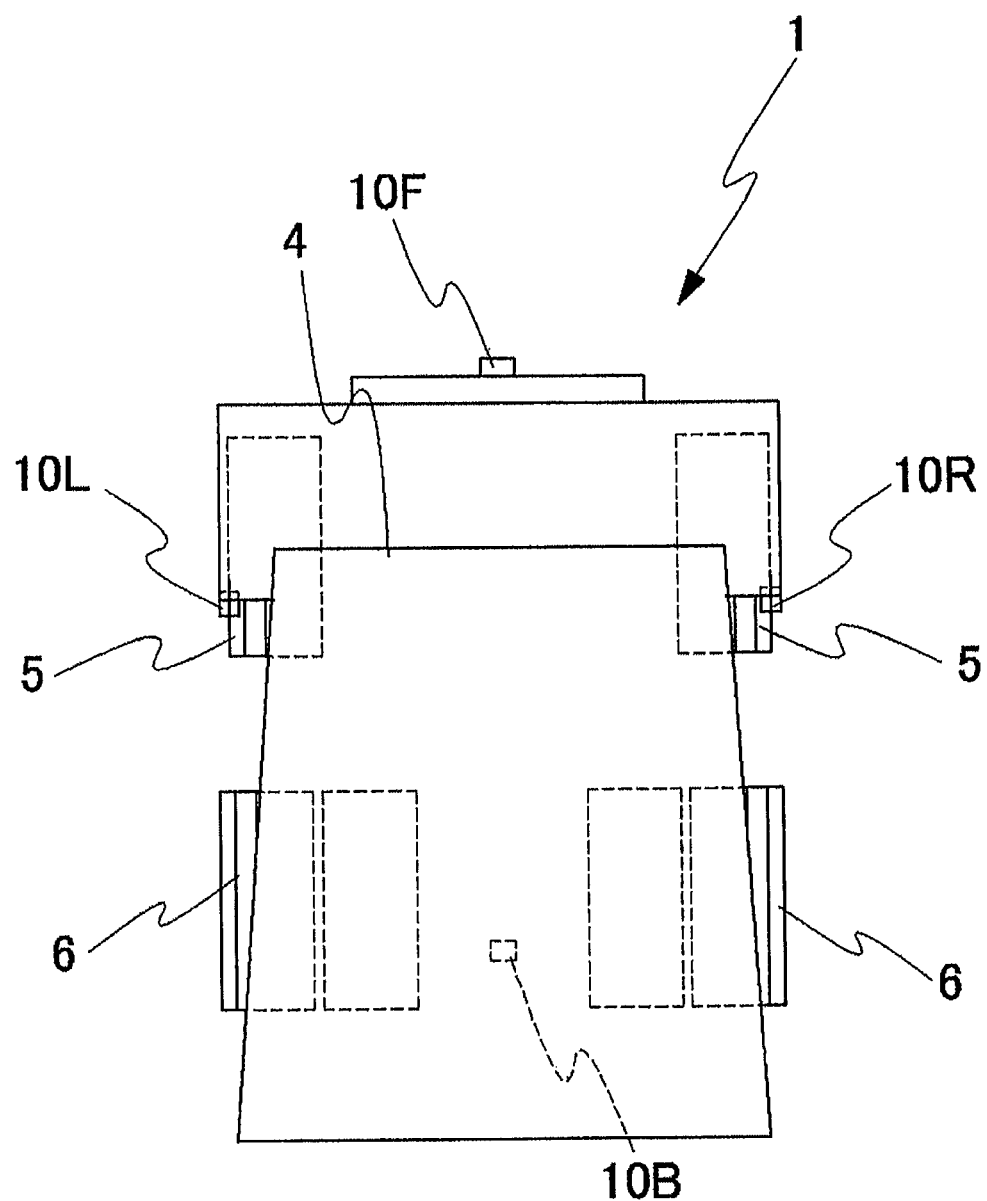
FIG. 2 is a plane view of the dump truck.

FIG. 1 shows the left-side elevation of the dunk truck 1 and FIG. 2 shows the plan view thereof. As shown in these drawings, the dump truck 1 comprises a operator's cab 2, a frame 3, a vessel 4, front wheels 5 and rear wheels 6, a driving cylinder 7 and a link mechanism 8. The front, rear, left side and right sides of the dump truck 1 are provided cameras 10 as around imaging device (forward camera 10F, right side camera 10R, left side camera 10L and backward camera 10B).

The forward camera 10F has a field of view toward the forward side, the backward camera 10B has a field of view toward the backward side, the right side camera 10R has a field of view toward the right side and the left side camera 10R has a field of view toward the left side, and these cameras take image obliquely downward direction, respectively. In other words, the optical axis of these cameras are directed to the obliquely downward. In this connection, number of cameras 10 may be arbitrary to be mounted on the dump truck 1. While, it is desired to provide that the backward camera 10B, the right side camera 10R and the left side camera 10L which are mounted at respective positions toward the directions possibly causing dead angle for the operator. In a case of an articulated type dump truck, further more cameras may be provided.

Many of the operator's cab 2 which is provided for boarding the operator to operate the dump truck 1 is placed at the left side at the dump truck 1. Various operating means are arranged in the operator's cab 2. The frame 3 constitutes a truck frame, the front wheel 5 is provided at the fore side of the frame 3 and the rear wheel 6 being provided at the rear side thereof. The vessel 4 is a platform which is loaded earth and sand, ore or the like. The vessel 4 is connected with driving cylinder 7 and link mechanism 8 for tilting action. Thereby, loaded earth and sand or the like is discharged out from the vessel 4.

Figure 3:
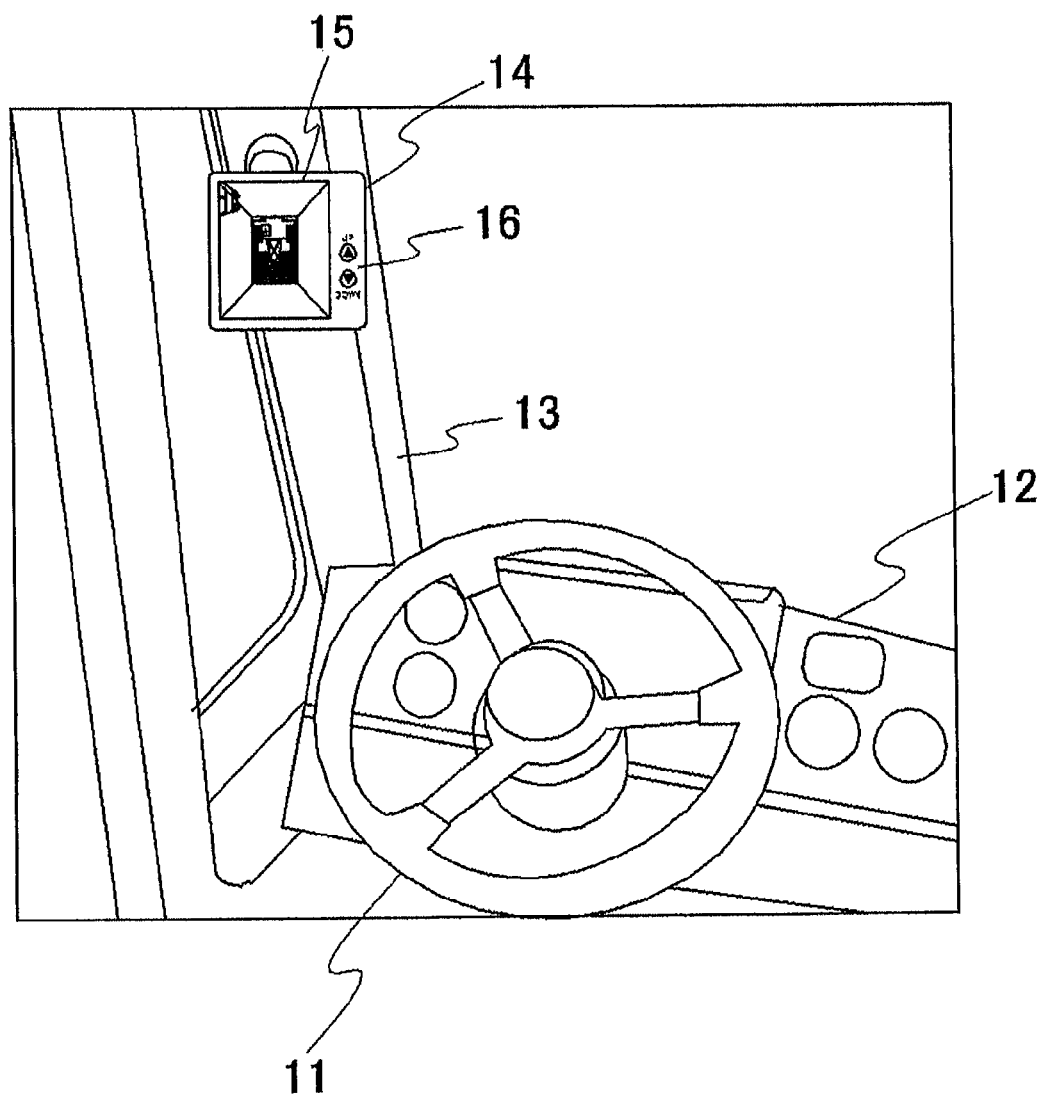
FIG. 3 is a drawing of an example of a monitor to be mounted in a cab.

FIG. 3 shows an example of the operator's cab 2. A handle 11 for performing operation of the driving direction and indicators for various meters are provided on a consol 12 and pillars 13 are installed in the operator's cab 2. In addition, a monitor 14 is installed to one of the pillar 13. The monitor 14 consists of a screen 15 and an input part 16. In this connection, the monitor 14 may be placed at an arbitral position within the operator's cab 2. Further, the screen 15 may be constituted as a touch panel so as to eliminate the input part 16.

Figure 4:
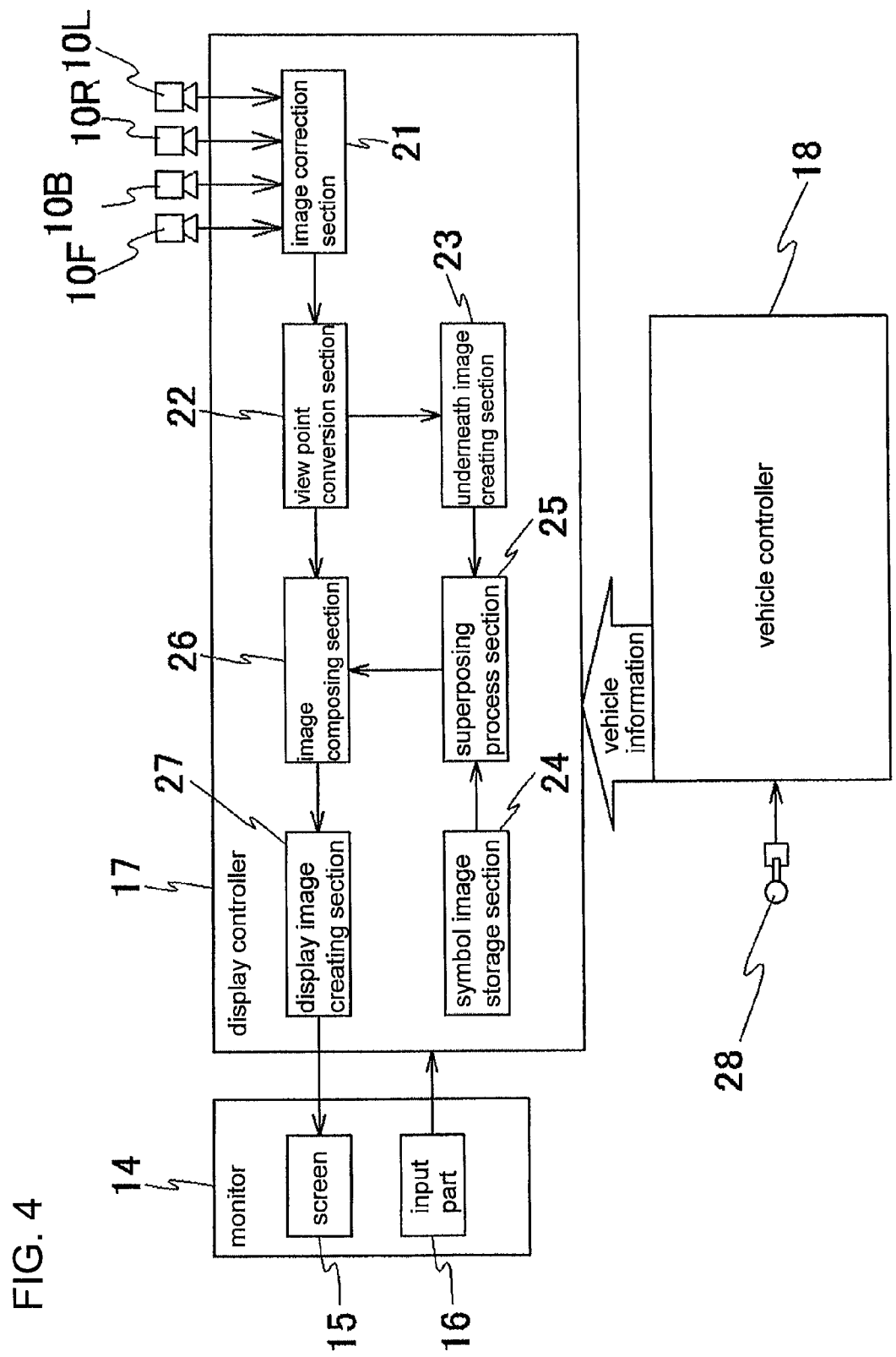
FIG. 4 shows a block diagram of a display controller.

FIG. 4 shows a display controller 17 connected to the monitor 14 and a vehicle controller 18 connected to the display controller 17. As shown in this figure, the display controller 17 comprises an image correction section 21, a view point conversion section 22, an underneath image creating section 23, a symbol image storage section 24, a superposing process section 25, an image composing section 26 and display image creation section 27. The respective sections of the display controller 17 may be achieved by a software and the functions of the respective section on the basis of CPU.

The image correction section 21 is inputted image data from the forward camera 10F, the backward camera 10B, the right side camera 10R and the left side camera 10L. And, the inputted image data are subjected to perform various image corrections such as aberration correction, contrast correction, color tone correction and so on, based upon parameters for camera optical system and the like. Thereby, the inputted image can be improved in the image quality. The corrected image in the image correction section 21 is inputted to the view point correction section 22 as an image data to be subjected for conversion.

Figure 5:
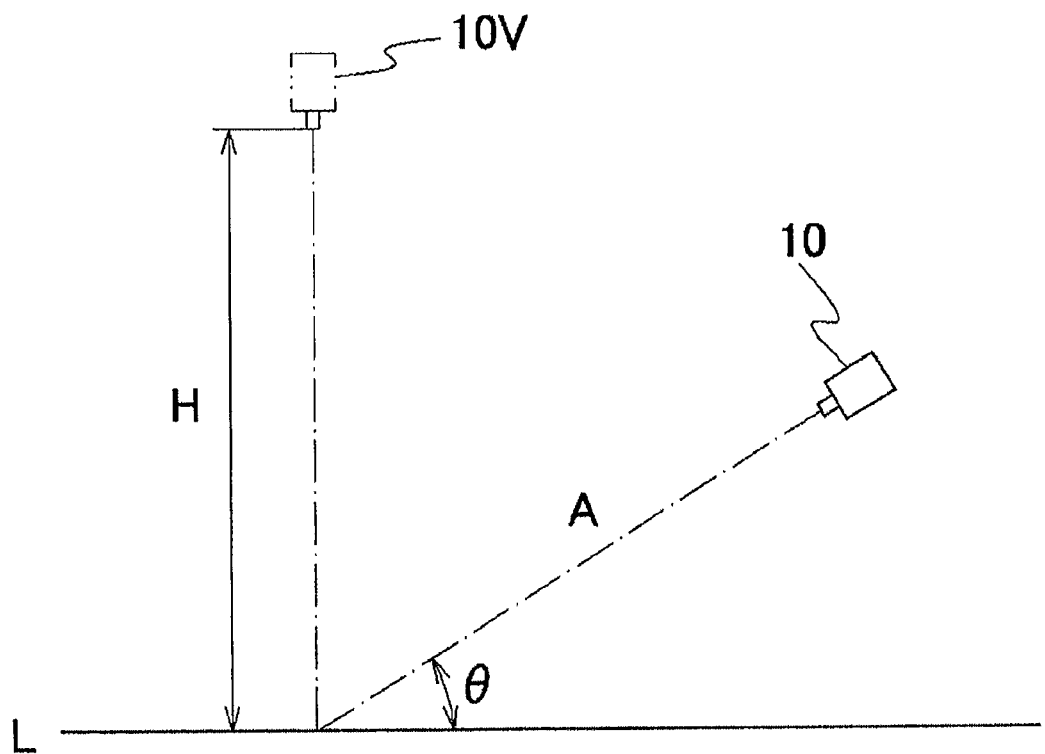
FIG. 5 shows an embodiment of a principle showing a method for treating a view point conversion.

The view point conversion section 22 is performed the view point conversion treatment for the image data entered from the image correction section 21 to create bird's eye view image (virtual view point image). As described hereinbefore, respective cameras 10 are directed the optical axis to obliquely downwardly and convert to virtual view point from upper position to downwardly. As shown in FIG. 5, the optical axis A of objective lens of cameras 10 (forward camera 10F, right side camera 10R, left side camera 10L and backward camera 10B) have a predetermined angle θ with respect to the grand lever L, therefore the optical axis of the cameras 10 are directed obliquely downwardly. According to the view point conversion section 22, virtual camera 10V is virtually set at height H with the vertical optical axis, and the coordinate is converted to view from the virtual camera 10V to the ground level L. The image which is converted to the upper view point is virtual plan view (bird's eye view image).

As shown in FIG. 4, the bird's eye view image converted the view points by the view point conversion section 22 are inputted to the underneath image creating section 23 and the image composing section 26. The underneath image creating section 23 is an bird's eye view image of under portion of the dump truck 1, in a case where including a sight of the underneath area in the bird's eye view image taken by the camera 10. Due to all image data being the bird's eye view image, the underneath image is also bird's eye view image. In this connection, all camera images may not be necessarily included the underneath areas. Accordingly, the underneath image of the camera 10 is not created if not including the field of view of the under the dump truck 1. In the foregoing example, the underneath image is not created due to the forward camera 10F does not be included the underneath image.

The symbol image storage section 24 has a symbol image data. The symbol image is an image of the dump truck 1 to display on the screen 15 as a symbol (character). That is, the symbol image is the reproduction image of the dump truck 1. By making high reproducibility, the operator can exactly recognize the feature of the dump truck 1. However, the reproducibility of the dump truck is not essentially necessary.

The superposing process section 25 is inputted the underneath image from the underneath image creating section 23 and the symbol image from the symbol image storage section 24. The superposing process section 25 makes transparency at the ratio of predetermined transparent degree and makes treatment to process the image to superpose the underneath image on the transparent region. The image processing is carried out the superimposing process (process for duplicate of images), the symbol image and the underneath image is overlaid at the same region, when the transparent ratio is not 100%. The ratio of transparency may be arbitrary controlled. The 100% transparent ratio is full transparency and 0% is non-transparency, further between them is a semi-transparency (or incomplete transparency).

The image composing section 26 is inputted the bird's eye view image converted the view point in the view point conversion section 22 together with the symbol image from the superposing process section 25. Then, the superposing is performed to place the symbol image at the center and the bird's eye view images being arranged therearound. The front bird's eye view image is produced from the forward camera 10F, the rear bird's eye view image is produced from the backward camera 10B and, the left and right side bird's eye view images are produced from the left and right sides cameras 10L and 10R. The composition is performed to allot the symbol image for the center and, to place the front bird's eye image for the fore side, the rear bird's eye view image for the back side, the left side bird's eye view image for the left side and the right side bird's eye view image for the right side.

The displaying image creation section 27 creates a single image for display of the composite image of the image composing section 26. The monitor 14 is displayed the single image for display on the screen 15. The operator boarded in the cab 2 can review the displayed image of the screen 15.

As shown in FIG. 4, the display controller 17 is connected to the vehicle controller 18. The vehicle controller 18 is inputted information from various operating means to control the dump truck 1. A shift lever 28 is one means to be connected thereto. The shift lever 28 is a travel operating means to control the travel of the dump truck 1, and is adapted to shift three positions of forward position, neutral position and backward position. At the time of the shift lever 28 placed at the forward position, the dump truck 1 runs forward direction, while at the backward position, the dump truck 1 running backward direction and at the neutral position, the dump truck 1 being stopped. The shift lever information as to the status of the position of the shift lever 28 (forward, neutral or backward) is outputted to the vehicle controller 18. Further, the shift lever information is transferred to the display controller 18 as a vehicle information.

Figure 6:
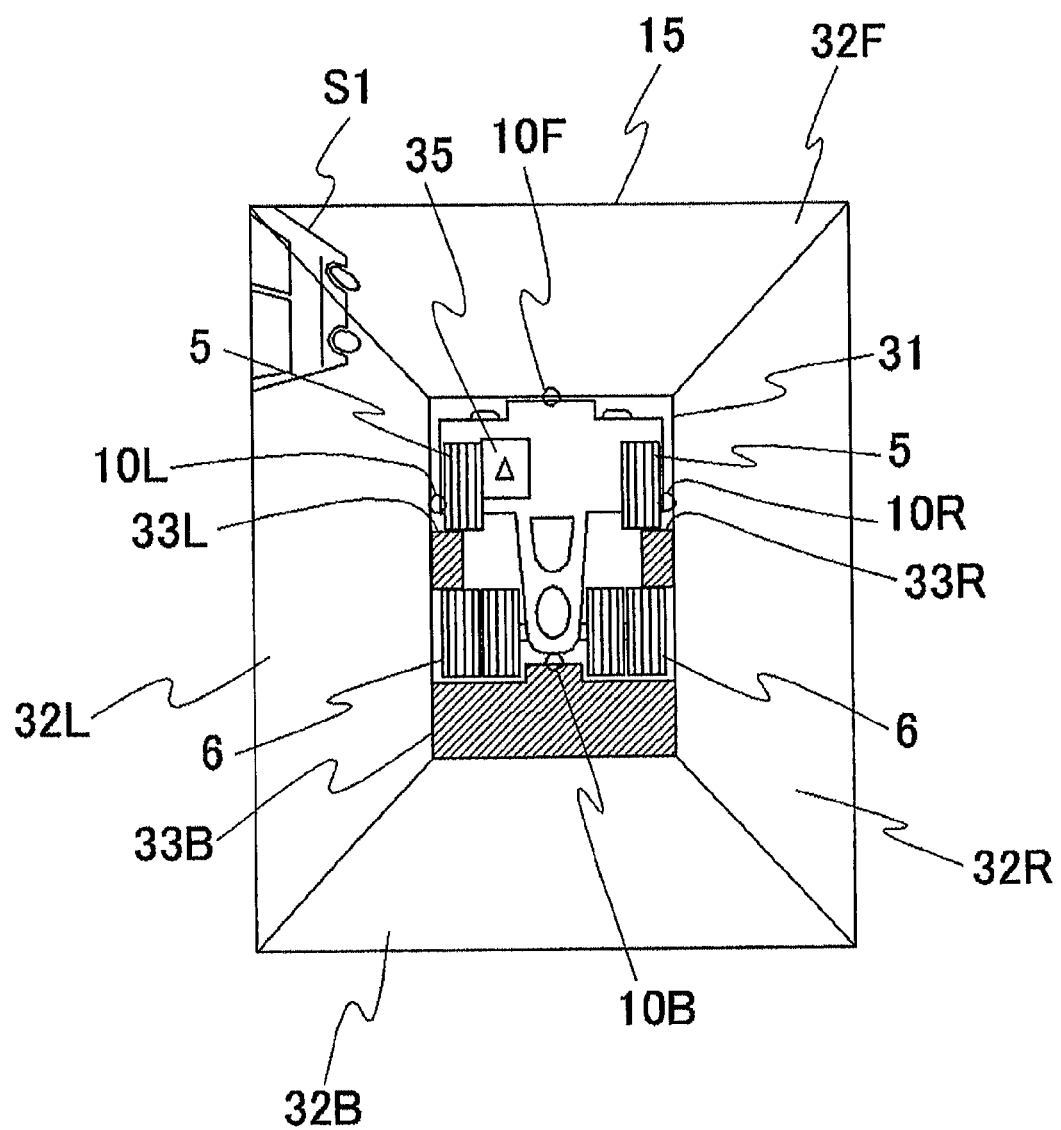
FIG. 6 shows an example of displayed image on a monitor screen.

The display controller prepares the display image which is displayed on the screen 15 of the monitor 24 on the basis of the constructions as explained above. FIG. 6 illustrates one embodiment showing the display image. As shown in this figure, the screen 15 is divided into several regions, 5 regions being applied in this case. A symbol image 31 is displayed at the center position of the screen 15. The symbol image 31 is, as explained hereinbefore, a symbol (character) of the contour of the dump truck 1.

In addition, there are fore, rear, left and right regions divided radially from the center symbol image 31. The fore side region from the symbol image 31 is displayed the fore side bird's eye view image 32F, the rear side region being displayed the back side bird's eye view image 32B, the right side region being displayed the right side bird's eye view image 32R and the left side region, being displayed the left side bird's eye view image 32 L. The fore side bird's eye view image 32F, the back side bird's eye view image 32B, the right side bird's eye view image 32R and the left side bird's eye view image 32L are correctively called as bird's eye view image 32.

Accordingly, respective cameras 10 should actually be executed at least for these bird's eye view images 32. For this reason, the operator operates to start up the engine, thereby respective cameras 10 becomes the situation to take images. As shown hereinbefore, the cameras are directed toward the obliquely downward direction, thereby, the forward camera 10F takes image to the obliquely forward position, the backward camera 10B takes image to the obliquely backward position, the right side camera 10R takes image to the rightward position and the left side camera 10L takes image to the leftward position.

The images taken from respective cameras 10 are outputted (transferred) to the display controller 17. Respective cameras 10 take image at a predetermined cycle, thereby transfer the image data at the imaging cycle. Thus, video image is displayed on the screen 15. In this connection, still image may be displayed.

As shown in FIG. 4, the image correction section 21 performs to predetermined correction process to the image data outputted from the cameras 10. The quality of the image data can be improved. The image data completed the correction process are subjected to convert the view point in the view point conversion section 22. The image taken from the fore side camera 10F is created the fore side bird's eye view image 32F, the image taken from the rear side camera 10B is created the back side bird's eye view image 32B, the image taken from the right side camera 10R is created the right side bird's eye view image 32R and the image taken from the left side camera 10L is created the left side bird's eye view image 32 L. Thus created bird's eye view images 32 are outputted to the image composing section 32.

Now, an over view image of the dump truck 1 is displayed on the screen 15 as shown in FIG. 6 by displaying respective bird's eye view images 32 around the symbol image 31. This is so-called bird's eye view image representation. The bird's eye view image representation causes to be recognized directly the distance between the dump truck 1 and obstacle S1 for the operator.

The bird's eye view image representation is, for example, useful in order to confirm as to whether or not a certain obstacle is present around here and there on starting the dump truck 1. It is specifically useful that the operator can, even toward the dead angle, confirm whether or not an obstacle is present at the near place. For this reason, the bird's eye view images 32 are shown the place near to the dump truck 1. The angle θ of respective optical axis of the cameras 10 to the ground level L as shown in FIG. 6 is set relatively greater angle. Thus, the situation surrounding of the dump truck 1 can be displayed in the facilitated manner.

In this connection, the back side camera 10B is mounted under the vessel 4. And the optical axis of the back side camera 10B is directed to obliquely downward direction, whereby the field of angle being included for the under area of the dump truck 1 (vessel 4). Specifically, the broader area under the dump truck 1 enters into the field of view, in a case of setting to large angle θ between the optical axis of the cameras 10 to the ground level L and wide angle for the back side camera 10B. The underneath area is shown with the bird's eye view image processed by means of the view point conversion and a broad underneath image can be processed by the underneath image creation section 23.

Similarly, the right side camera 10R and the left side camera 10L are provided at the rear portion of the cab 2, the positions thereof are deviated from the upper position of the front wheel 5. The right side camera 10R and the left side camera 10L have the field of view toward the right and left side, but may be included the field of view at the underneath position of the dump truck 1 same as the back side camera 10B. In a case where the angle θ is relatively greater angle and wide angle for the right side camera 10R and the left side camera 10R, the field of view in the right side camera 10R and the left side camera 10L are included in at the underneath of the dump truck 1.

Accordingly, the underneath image of the dump truck 1 included in the right side camera 10R and the left side camera 10L are adapted to display on the screen 15 of the monitor 14. The underneath image creating section 23 are entered to the respective bird's eye view images 32 from the view point conversion section 22. But, the front side bird's eye view image 32F is not entered in the embodiment of FIG. 6.

The underneath image creating section 23 creates underneath image of the dump truck 1 of the back side bird's eye view image 32B, the right side bird's eye view image 32R and the left side bird's eye view image 32L. Accordingly, underneath image of rearward area (back side underneath image), underneath image of rightward area (right side underneath image) and underneath image of the leftward area (left side underneath image) are prepared.

The symbol image storage section 24 is stored the symbol image 31 of FIG. 6 which is reproduced the contour of the dump truck 1. The symbol image 31 of this figure indicates the front wheel 5, the rear wheel 6 and the like, further denotes the provision position of the respective cameras 10. The symbol image storage section 24 outputs the symbol image 31 to the superposing process section 26.

The superposing process section 25 performs to make transparent of region corresponding to the underneath image of the symbol image 31. In this embodiment, the underneath region corresponding to the back side image is the back side transparent region 33B, the underneath region corresponding to the right side image is the right side transparent region 33R and the underneath region corresponding to the left side image is the left side transparent region 33L. In FIG. 6, respective transparent regions are indicated with hatching. Further, the back side transparent region 33B, the right side transparent region 33R and the left side transparent region 33L are correctively called as transparent region 33.

Respective transparent regions 33 in the underneath image are in advance known, because the position, the angle of view, the direction of optical axis and the like have been set beforehand. Accordingly, respective transparent regions are preset in the symbol image 31. The afore-mentioned underneath back side region 33B is allocated the underneath back side image (given reference numeral 34B), the underneath right side region 33R is allocated the underneath right side image (given reference numeral 34R) and underneath left side region 33L is allocated the underneath left side image (given reference numeral 34L). The underneath back side image 34B, the underneath right side image 34R and the underneath left side image 34L are correctively called as underneath image 34.

Figure 7:
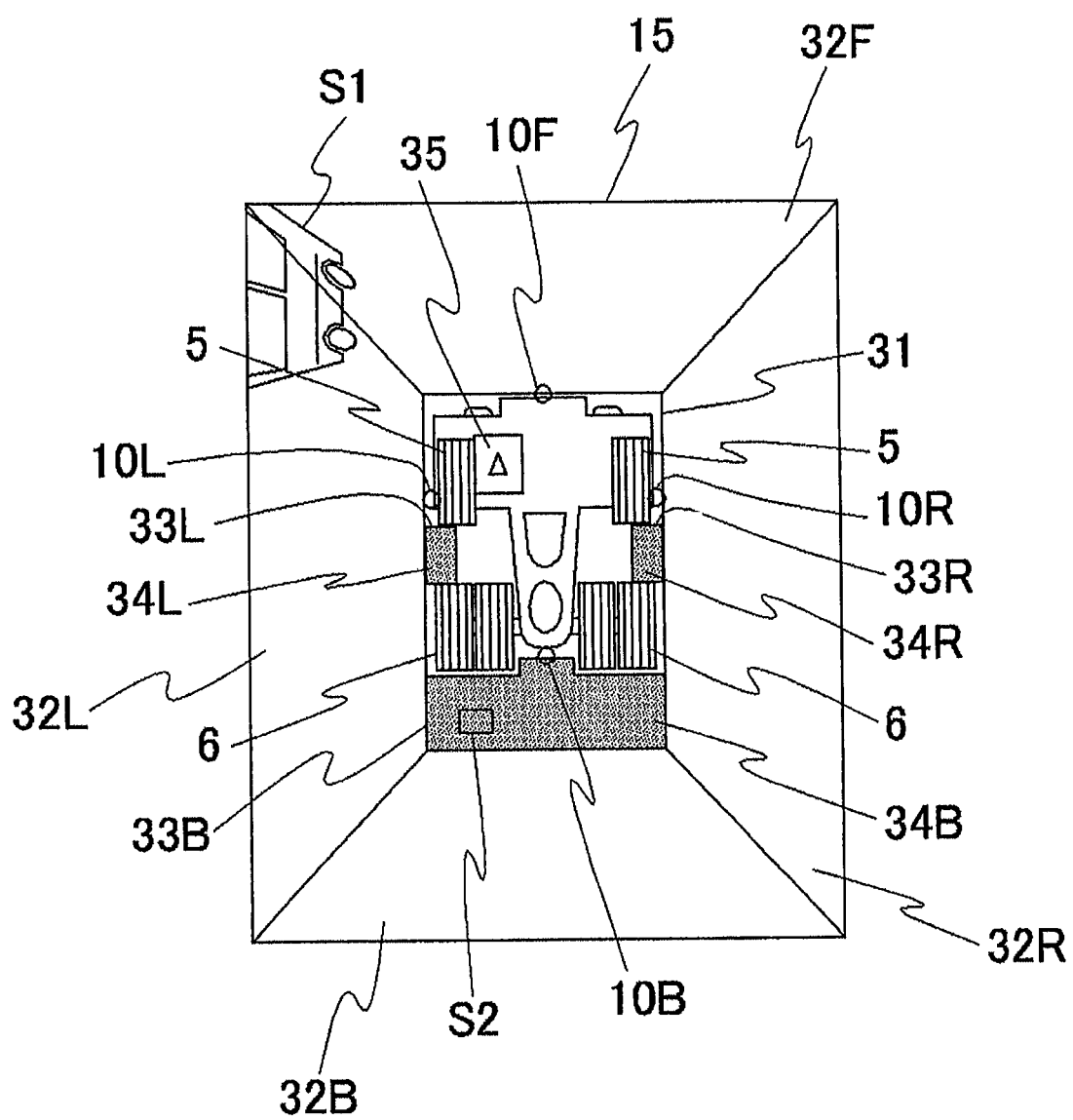
FIG. 7 is an example shown superposed an underneath image in FIG. 6.

Accordingly, the superposing process section 25 performs to transmit a predetermined transmittance of the back side transparent region 33B, the right side transparent region 33R and the left side transparent region 33L and superposes the underneath back side image 34B, the underneath right side image 34R and the underneath left side image 34L (superimpose). One embodiment is shown in FIG. 7. In this figure, an obstacle S2 is projected in the underneath back side image 34B. The operator can recognize the presence of the obstacle S2 by viewing the underneath back side image presented on the screen 15. Under this circumstance, the operator can recognize to contact the rear wheel 6 with the obstacle S2 when the dump truck 1 is caused to move backwardly by the operation of the shift lever 28. Accordingly, the operator can aware of prohibited to change the shift lever 28 to backward position.

As explained hereinbefore, the bird's eye view image representation is shown by processing the conversion of the view point of the images taken by respective cameras (back side camera 10B, right side camera 10R and left side camera 10L). Accordingly, around the dump truck 1 is able to recognize at a glance. The bird's eye view image representation is the image taken from the virtual view point at upper position over view to the ground level L. Accordingly, the underneath image of the dump truck 1 cannot be shown in the bird's eye view image due to normally be hidden by the construction such as the cab 2 and so forth.

However, the foregoing cameras 10 may sometimes have field of view underneath of the dump truck 1. In such cases, the underneath image creating section 23 can create the underneath image and the superposing process section 25 makes transparent on the symbol image and composes the underneath image thereto, thus allowing the symbol image 31 to have information of the underneath image of the dump truck 1. Thereby, the operator is able to recognize the situation of under the dump truck 1 by the underneath image of the symbol image 33, in addition to the surroundings of the dump truck 1. For this purpose, it is not necessary to provide additional camera to be used for taking image of underneath other than the cameras for the bird's eye view image representation.

Still, as shown in FIG. 6 and FIG. 7, the cab 2 represented in the symbol image 31 is placed a destination icon 35. The destination icon 35 represents the direction of the operator. In this embodiment, the direction is indicated by an arrow of triangle. The destination icon 35 can be changed in response to the travelling direction of the dump truck 1. Since the display controller 17 is transferred information as to traveling direction from the vehicle controller 18, the triangle can be rotated in accordance with the traveling direction. For example, the triangle becomes reverse direction when the dump truck 1 travels backward.

In the foregoing case, the superposing process section 25 makes transparent for respective transparent regions 33 of the symbol image 31 at a ratio of predetermined transparency, the ratio of transparency being not full nor non-transparency (for example 50% transparency). Thus, the superposing process section 25 is composited with the underneath image on the transparent region, thereby allowing to recognize the situation under the dump truck 1. While, the contour of the symbol image 31 is indicated by composing the underneath image for the symbol image 31 at the transparent region.

The ratio of the transparency can be settled beforehand or controllable as desired. For example, the ratio of transparency may be controlled arbitrary by means of the input part 16 of the monitor 14. When decreasing the transparency, that is closing to 0% (non transparent), the underneath image looses the clarity. Accordingly, the visibility of the situation for underneath area of the dump truck 1 becomes unclear. Thereby, the obstacle S2 cannot be displayed clearly. While, the outline of the symbol image 31 becomes sharpened.

The bird's eye view image representation displayed the bird's eye view images around the symbol image 31 is important to induce the operator as to feeling of distance between the dump truck 1 and around there. For example, distance between the dump truck 1 and an obstacle S1 (service car) can be recognized precisely as illustrated in FIG. 7. In this sense, it is important that the contour of the symbol image 31 indicates clearly. In a case of higher transparency, the outline for the transparent region of the symbol image 31 becomes difficult to distinguish, thus the operator encounters difficulty to recognize the distance between the dump truck 1 and its surroundings.

Figure 8:
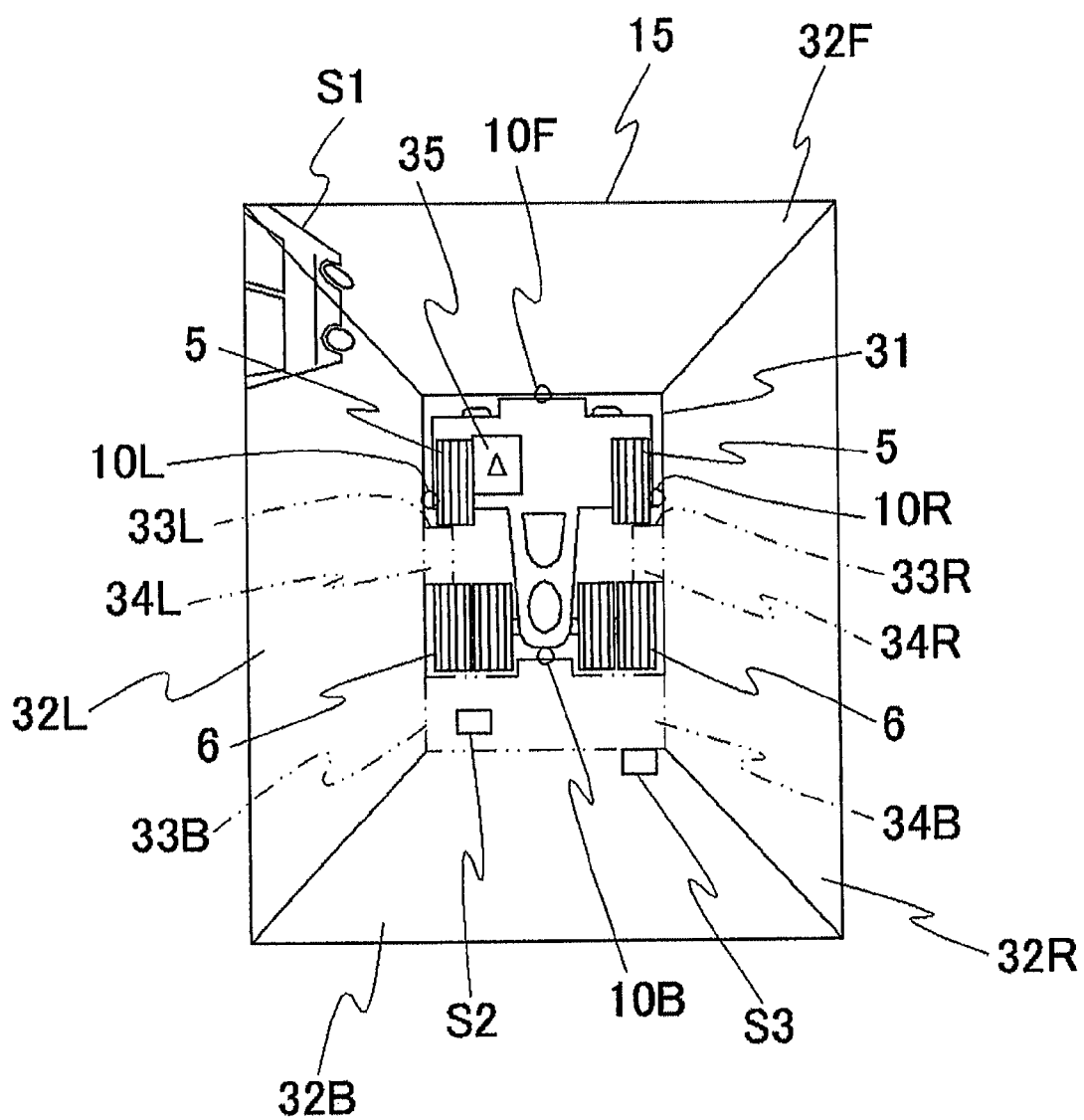
FIG. 8 is an exemplary drawing of lost of the transparent region at the time of full transparent status on the transparent region.

On the contrary, if enhancing the ratio of transparency, that is near to 100% (full transparency), the underneath image becomes clear. The visibility of the underneath of the dump truck 1 is improved by doing so. For attaining highest visibility, the transparency is set to 100%, namely set to full transparency. FIG. 8 shows the status of full transparency.

In accordance with the status shown in FIG. 8, the transparent region has completely be disappeared out of the symbol image 31 (although phantom line is written to effaced transparent region for the explanation, the phantom line is not appeared actually). Thus accordingly, one cannot recognize the distance between the dump truck 1 and surroundings. In FIG. 8, the transparent region of the dump truck 1 comes close nearly to contact with the obstacle S3. Although the operator can find the obstacle S3, the operator is not aware that it is approached nearly in contact with the obstacle S3 due to be distinguished the transparent region. Accordingly, the object cannot be inherently attained for the bird's eye view image representation.

Figure 9:
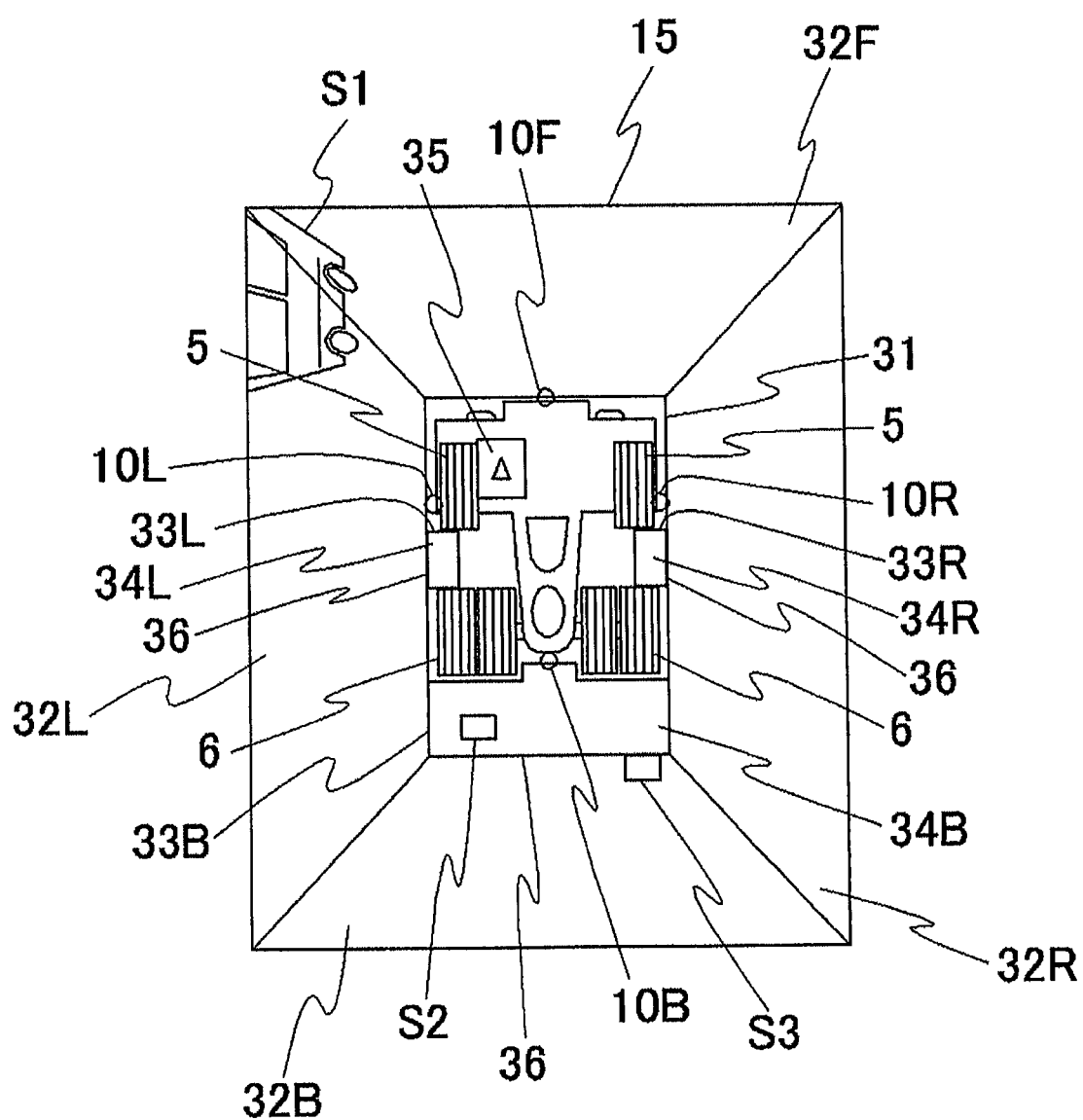
FIG. 9 is a drawing indicating an outline of the transparent area at the full transparent of the transparent region.
Figure 10:
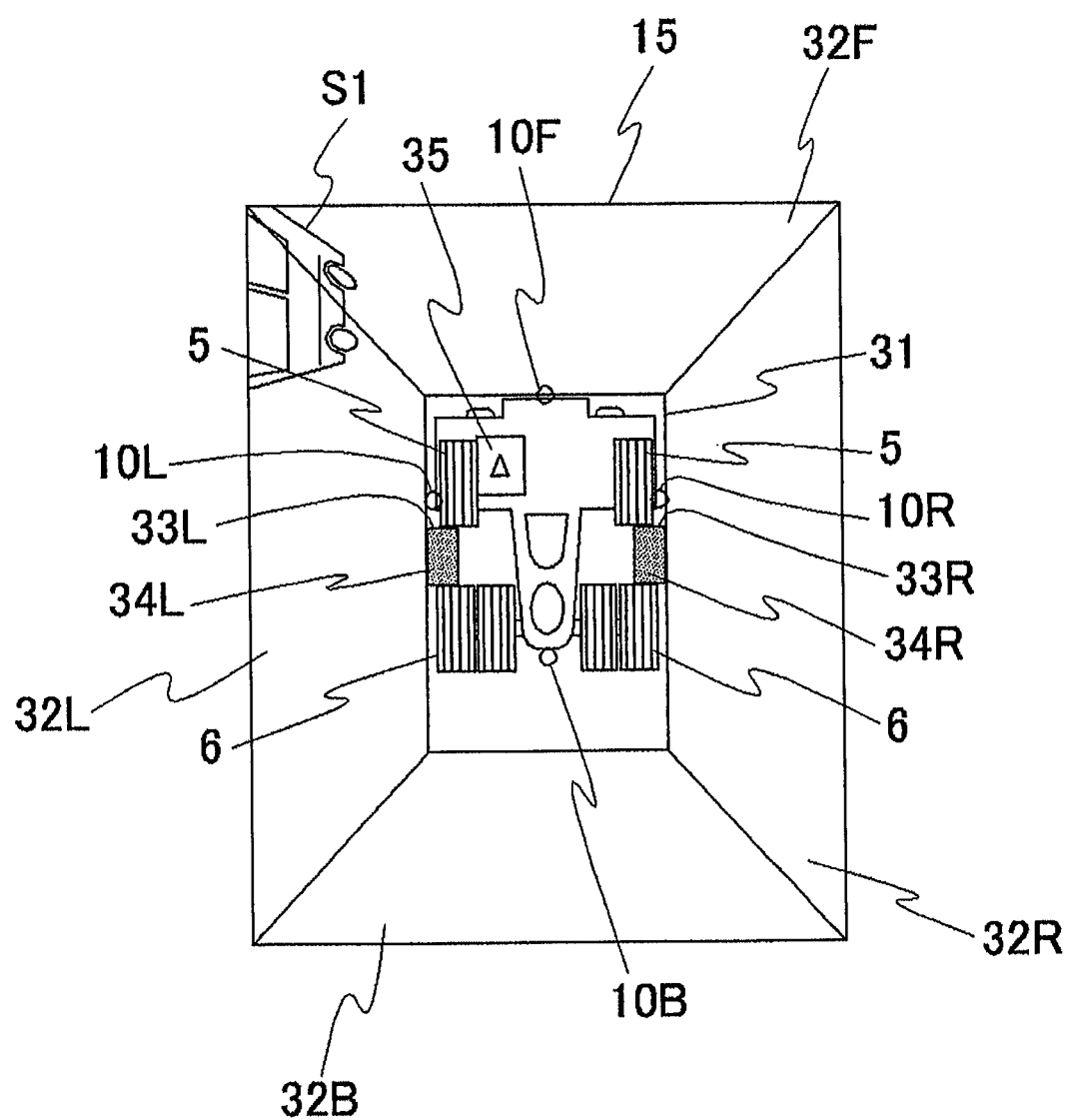
FIG. 10 is an illustrative drawing showing to divide the transparent area and transparent area upon operating a shift lever.

Accordingly, in a case of setting the transparent ratio to 100% (full transparent), as shown in FIG. 9, the contour line (outline) 36 is indicated at the outer periphery of the transparent region by the image composing section 26. Thereby, the contour of the symbol image 31 is clearly depicted on the screen 15. By so constructing, the feeling of the distance from the dump truck 1 is adapted to understand by means of the outline 36. In addition, the obstacle S2 which is placed under the vessel 4 is displayed clearly on the screen by the full transparent of the transparent region. Thus accordingly, the operator can understand that the obstacle S2 is presence the position under the dump truck 1 (vessel 4) at a glance. In addition, the understanding is included that the obstacle S3 is close to nearly contact with the dump truck 1

The outline 36 is preferred to indicate the same line as the symbol image 31. For example, the outline 36 is indicated with the same line as color, kind of line or the like. As a result, the operator can be understood that the outline 36 constitutes the boundary of the symbol image 31, in other words, stands as a part of the dump truck 1.

Next, the process in the image composing section 26 at the time of traveling the dump truck 1 is explained hereinafter. The operator boarded in the cab 2 is operated the shift lever 28 for traveling the dump truck 1. As explained hereinbefore, the shift lever 28 has forward position, neutral position and rearward position, and is determined whether or not to initiate to travel and the direction for driving in light of the position of the shift lever 28. The information as to the position of the shift lever 28 (shift lever information) is entered to the vehicle controller 18, then the vehicle controller 18 outputs the shift lever information to the display controller 17.

The superposing process section 25 is inputted the shift lever position information. The superposing process section 25 performs whether or not to make transmission of respective transparent regions 33 according to the shift lever position information, that is based upon the position of the shift lever 28.

Accordingly, the dump truck 1 is to move forward upon shifting the shift lever 28 to the forward position. At this time, the dump truck 1 does not contact with the obstacle S2, although the obstacle S2 is placed at the rear transparent region, that is the obstacle S2 is placed under the dump truck 1. Accordingly, the situation of the rearward transparent region 33B is not necessary to show on the screen 15 at the time of forward traveling the dump truck 1. Under this situation, the superposing process section 25 causes the rearward transparent region 33B to be non-transparent (transparent ratio becomes 0%) state. Thereby, the contour of the symbol image 31 is shown definitely, so as to improve the visibility for the operator. In addition, there is no necessity to perform the image processing by the composing process section 25 for composing the underneath back side image 34B to make transparent the rearward transparent region 33B.

On the contrary, when the shift lever 28 is put to the rearward side, the dump truck 1 moves to backward direction. In this instance, the obstacle S2 which is present in the rearward transparent region 33B will be contact with the dump truck 1. The superposing process section 25 proceeds the image processing to compose the underneath back side image 34B by making transparent of the backward transparent region 33B, upon understanding of the backward moving of the dump truck 1. Accordingly, an image of FIG. 7 is shown on the screen. Thereby, the operator can recognize the situation under the dump truck 1 at the rearward by viewing the underneath back side image 34B.

While, at the time of the dump truck 1 travels forward and backward directions, the superposing process section 26 composes the underneath right side image 34R by making transparent of the right side transparent region 33R and composes the underneath left side image 34L by making transparent of the left side transparent region 33L. As shown in FIGS. 6 to 10, the right side transparent region 33R and the left side transparent region 33L are contacted with either the front wheel 5 or the rear wheel 6 in either case of the dump truck 1 travels forward direction or backward direction. Accordingly, the underneath right side image 34R and the underneath left side image 34L are displayed at the time where the shift lever 28 is enter to the forward position or backward position.

The shift lever 28 may be entered the neutral position. In this situation, the dump truck 1 is stopped. Accordingly, the underneath back side transparent region 33B, the underneath right side transparent region 33R and the underneath left side transparent region 33L stand non-transparent situation. Thereby, the symbol image 31 which is stored in the symbol image storage section 24 is outputted to the image composing section 26 as it is, without making the transparent process of the superposing process section 25. There is no problem even if the obstacle S2 is placed under the dump truck 1. In this situation, safety is surely maintained without displaying the underneath image 34. From this situation, the shift lever 28 is operated from the neutral position to the forward position or the backward position, the dump truck 1 is moved forward direction or backward direction. Accordingly, even though at the stopped status of the dump truck 1, the underneath image 34 may be displayed on respective transparent regions 33.

Thus, the superposing process section 25 brings to display the necessary underneath image 34, but not to display the unnecessary underneath image. The superposing process section 25 performs to make transparent process for displaying the underneath image 34. As a result, the visibility of the outline for the symbol image 31 may be deteriorated. For this purpose, the symbol image 31 is displayed in a simple manner due to eliminate to display the unnecessary underneath image 34 based upon the position of the shift lever 28, thus improving the operator's visibility.

Figure 11:
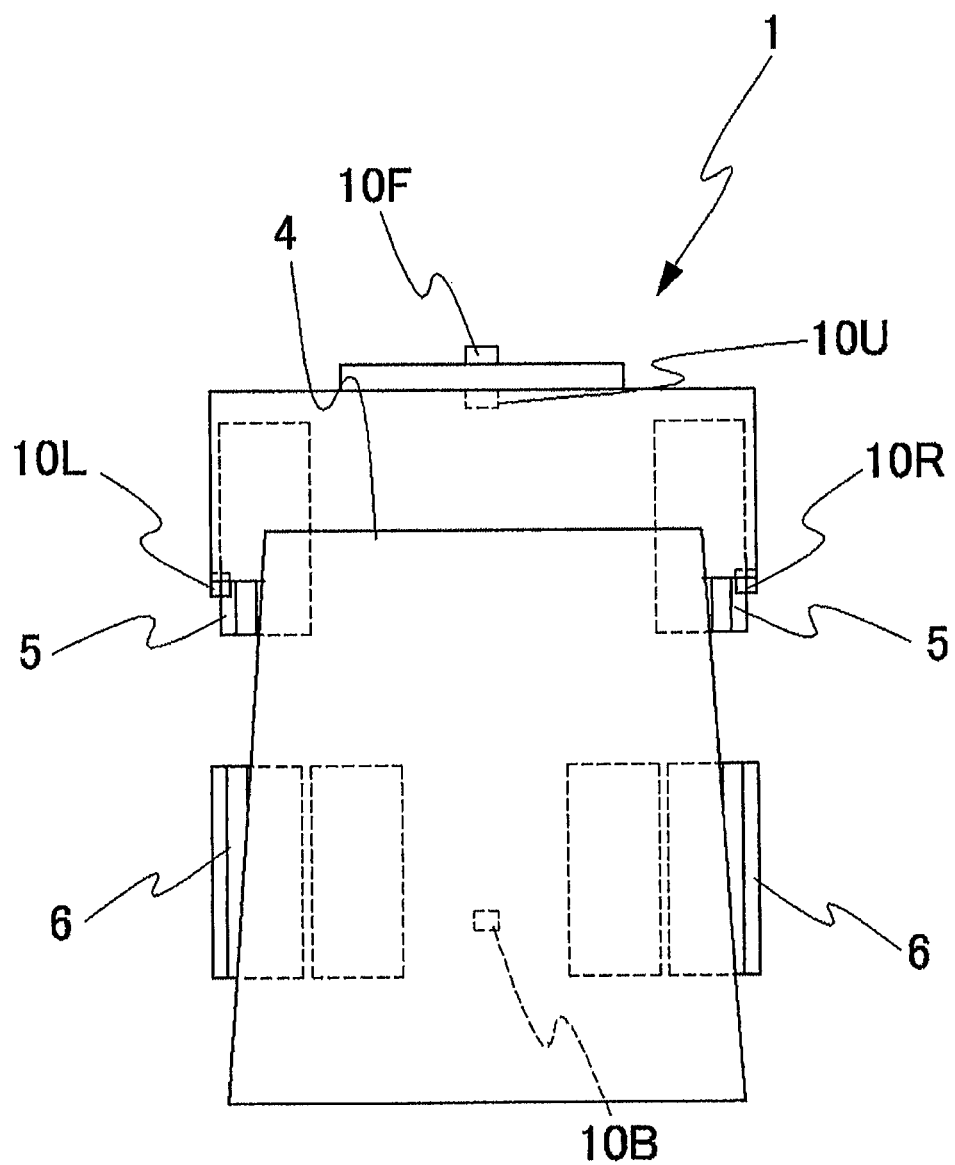
FIG. 11 is a plane view of a dump truck provided a under camera for viewing the underneath of the dump truck.

Hereafter is referred to in a case where a camera is provided for specific use for the under portion of the dump truck 1. The under camera 10U shown in FIG. 11 is a imaging section provided for taking image of the underneath of the dump truck 1 but not imaging the circumference area. Accordingly, the under camera 10U has a field of view inside of underneath of the dump truck 1.

The forward camera 10F, rearward camera 10R, right side camera 10R and left side camera 10L are provided to prepare bird's eye view image for displaying around the dump truck 1. Accordingly, these cameras have angle of views outside of the dump truck 1. Since some under areas of the dump truck 1 are included in the view field of the cameras 10, the symbol image 31 is made partially transparent by using them as the underneath image. In this sense, these forward camera 10F, rearward camera 10R, right side camera 10R and left side camera 10L are circumference imaging parts as well as the foregoing imaging part.

Figure 12:
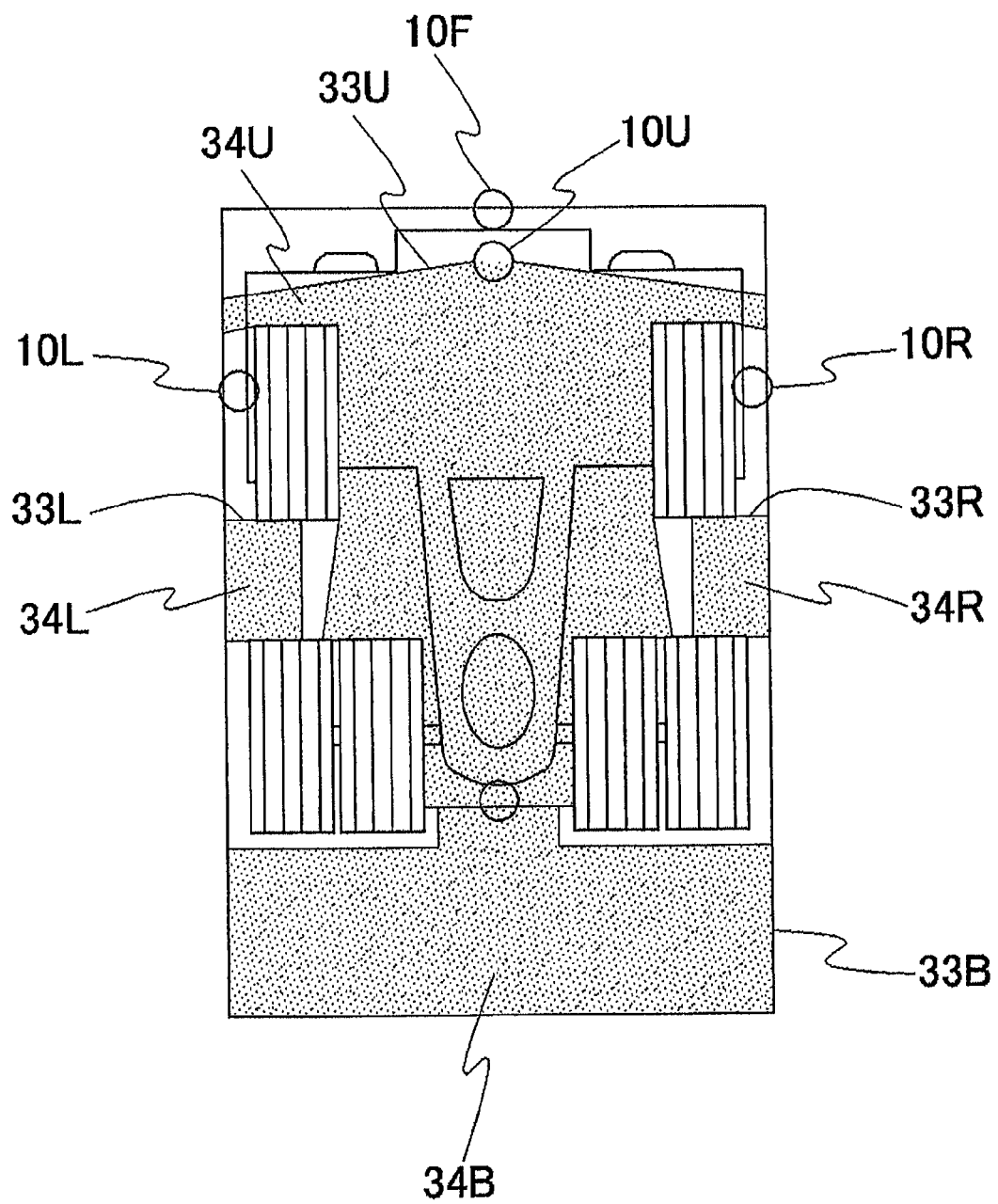
FIG. 12 shows an example of a symbol image by using the under camera.

For showing the underneath situation of the dump truck 1 in the form of bird's eye view image 31, bird's eye view image surrounding to the bird's eye view image 31 can be omitted from the display. That is to say, it is adapted that the screen 15 is displayed only the symbol image 31 as shown in FIG. 12. The dump truck 1 is provided the under camera 10U, as explained above, to take inside image under the dump truck 1. The optical axis of the under camera 10U is directed to obliquely downward, and the obtained image is subjected to, after performing correction process, be converted to the bird's eye view image in the view point conversion section 22.

As shown in FIG. 12, the under camera 10U is an imaging section to take image under the dump truck 1 having wide area of the underneath of the dump truck 1. Accordingly, as shown this figure, broader area of the symbol image 31 belongs to a inside underneath transparent region 33 U and is brought to be superposed broadly at the inside underneath transparent region 33U by means of the superposing process section 25. In FIG. 12, the forward camera 10F, rearward camera 10R, right side camera 10R and left side camera 10L are provided so as to prepare bird's eye view image for displaying around the dump truck 1, for displaying forward camera 10F, rearward camera 10R, right side camera 10R and left side camera 10L. Then, the under area of the dump truck 1 is broadly shown as the symbol image 31.

Accordingly, the situation of the dump truck 1 is shown to the extent widely in area in order to be recognized by the operator, because that the under camera 10U having the field of view to the underneath of the dump truck 1 so as to display the inside underneath image 34U on the symbol image 31. Although the underneath back side image 34B, the underneath right side image 34R and the underneath left side image 34L are displayed by means of the forward camera 10F, rearward camera 10R, right side camera 10R and left side camera 10L in FIG. 12, the underneath image of the dump truck 1 may solely be displayed on the symbol image 31 by using the under camera 10U. Further, the under camera is not restricted one camera but may be consisting plural cameras.

Figure 13:
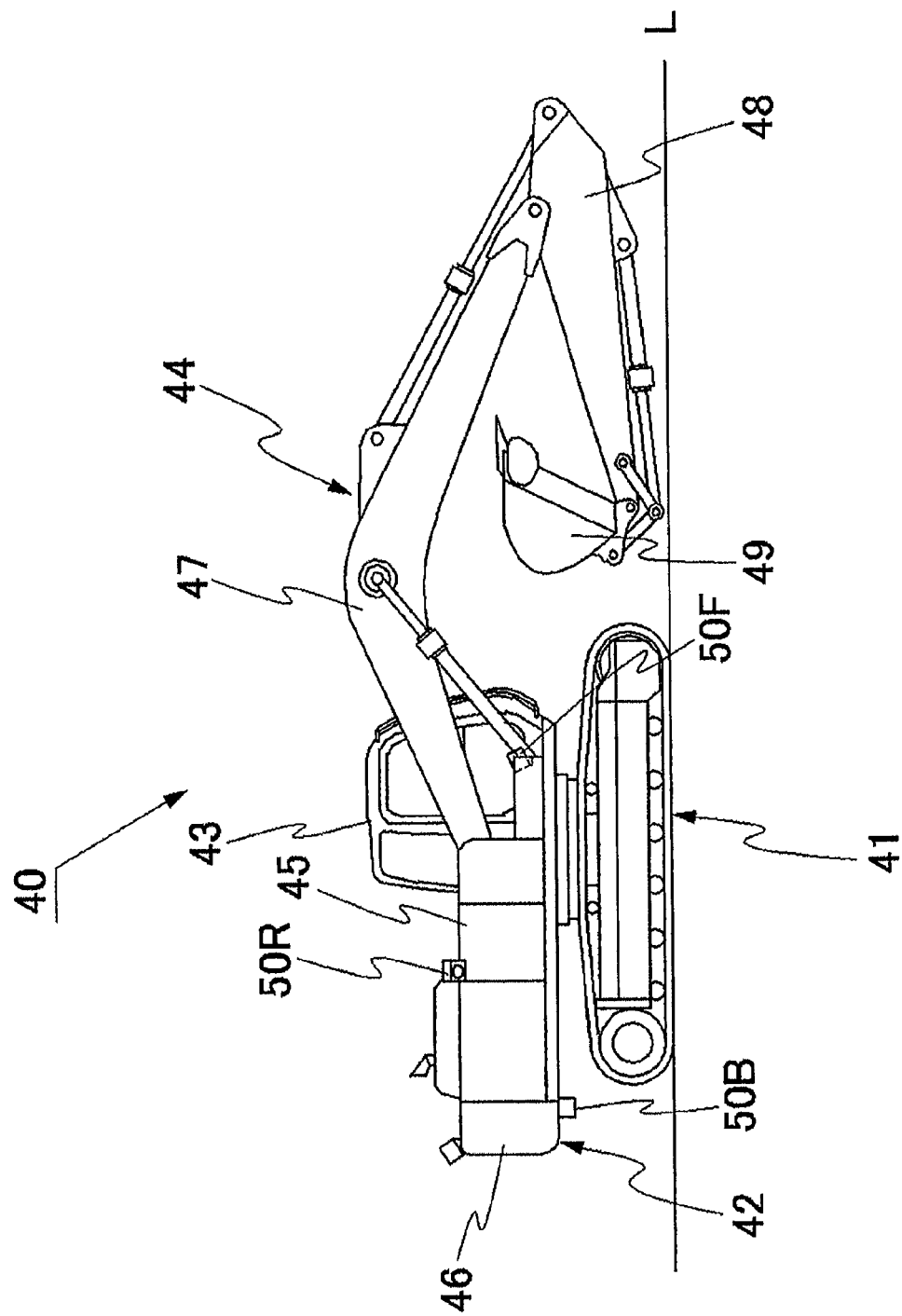
FIG. 13 shows a left side view of a hydraulic excavator.

The foregoing is the explanation as to the dump truck 1 for the self-propelled industrial machine, a hydraulic excavator 40 as shown in FIG. 13 is also applied as another type self-propelled industrial machine. The hydraulic excavator 40 consists of a vehicular base structure 41 and a upper swiveling structure 42 connected to the lower vehicular base structure 41 adapted to rotate in the horizontal plane. The upper swiveling structure 42 has a cab 44, working mechanism 44, a machinery housing 45 and a counterweight 46. The working mechanism 44 constitutes a boom 47, an arm 48 and a bucket 49. A normal hydraulic excavator 40 is constructed as generally explained above.

The forward camera 50F, rearward camera 50R, right side camera 50R and left side camera 50L (not shown) are provided for the hydraulic excavator 40. The foregoing cameras are provided for the same object with the forward camera 10F, rearward camera 10R, right side camera 10R and left side camera 10L, for the bird's eye view image representation around the hydraulic excavator 40. The forward camera 10F is mounted in the vicinity of the cab 43, and the rearward camera 50B is under side of the counterweight 46. Further, the right side camera 50R and the left side camera 50L are mounted to the machinery housing 45.

A wide space is formed under the counterweight 46. The rearward camera 50B is taking image of the rearward, the optical axis thereof is directed to obliquely downward direction. Accordingly, the same result as explained to the dump truck 1 is attained by showing the underneath image in the symbol image.

DESCRIPTION OF REFERENCE NUMERALS

1: dump truck
2: cab
10: camera
14: monitor
15: screen
17: display controller
21: image correction section
22: view point conversion section
23: underneath image creating section
24: symbol image storage section
25: superposing process section
26: image composing section
27: displaying image creating section
28: shift lever
31: symbol image
32: bird's eye view image
33: transparent region
34: underneath image
33U: inside transparent region
34U: inside underneath image

The invention claimed is:

1. A display apparatus mounted on a dump truck which has a frame; a left front wheel, a right front wheel, a left rear wheel, and a right rear wheel provided on the frame; and a vessel provided on the frame, the display apparatus comprising:

a plurality of periphery imaging cameras which are provided on the dump truck, the periphery imaging cameras including a backward camera having a field of view of an underneath area of the dump truck, a left side camera having a field of view including a region between the left front wheel and the left rear wheel of the underneath area of the dump track, and a right side camera having a field of view including a region between the right front wheel and the right rear wheel of the underneath area of the dump track;

a processor programmed to process image information obtained from the periphery imaging cameras to create a single display image including a symbol image of the dump truck and the processed image information, the symbol image including the left front wheel, the left rear wheel, the right front wheel, and the right rear wheel; and a display provided in a cab of the dump truck and which is configured to display the single display image created by the processor, wherein the processor is further programmed to:

convert view points of a rear side image obtained by the backward camera, a left side image obtained by the left side camera, and a right side image obtained by the right side camera to create a rear bird's eye view image, a left side bird's eye view image, and a right side bird's eye view image, obtain an image region corresponding to the underneath area from the rear bird's eye view image to create a back side underneath image, process a region of the symbol image corresponding to the back side underneath image to be a back side transparent region and superpose the back side transparent region of the symbol image on the back side underneath image, create a composite image with the symbol image with the superposed back side underneath image placed at a center thereof and the rear bird's eye view image, the left side bird's eye view image, and the right side bird's eye view image arranged therearound, and create the single display image from the composite image.

2. The display apparatus according to claim 1, wherein the processor is further programmed to:

obtain an image region corresponding to the region between the left front wheel and the left rear wheel from the left side bird's eye view image to create a left side underneath image, obtain an image region corresponding to the region between the right front wheel and the right rear wheel from the right side bird's eye view image to create a right side underneath image, process a region of the symbol image corresponding to the left side underneath image to be a left side transparent region and superpose the left side transparent region of the symbol image on the left side underneath image, process a region of the symbol image corresponding to the right side underneath image to be a right side transparent region and superpose the right side transparent region of the symbol image on the right side underneath image, and create the composite image with the symbol image with the superposed back side underneath image, the superposed left side underneath image and the superposed right side underneath image.

3. The display apparatus according to claim 1, wherein the region of the symbol image corresponding to the back side underneath image is processed to be the back side transparent region which is fully transparent and the single display image includes the superposed back side underneath image and only an outline of the back side transparent region.

4. The display apparatus according to claim 1, wherein the region of the symbol image corresponding to the back side underneath image is processed to be the back side transparent region which has a predetermined degree of transparency which is greater than non-transparent and less than fully transparent.

5. The display apparatus according to claim 1, wherein the region of the symbol image corresponding to the back side underneath image is processed to be the back side transparent region having a predetermined degree of transparency based on a travel operation lever of the dump truck.

6. The display apparatus according to claim 2, wherein the region of the symbol image corresponding to the left side underneath image is processed to be the left side transparent region which is fully transparent and the single display image includes the superposed left side underneath image and an outline of the left side transparent region, and
wherein the region of the symbol image corresponding to the right side underneath image is processed to be the right side transparent region which is fully transparent and the single display image includes the superposed right side underneath image and an outline of the right side transparent region.

7. The display apparatus according to claim 2, wherein the region of the symbol image corresponding to the left side underneath image is processed to be the left side transparent region which has a predetermined degree of transparency which is greater than non-transparent and less than fully transparent, and
wherein the region of the symbol image corresponding to the right side underneath image is processed to be the right side transparent region which has the predetermined degree of transparency.

8. The display apparatus according to claim 2, wherein the region of the symbol image corresponding to the left side underneath image is processed to be the left side transparent region which is fully transparent and the single display image includes the superposed left side underneath image and only an outline of the left side transparent region, and
wherein region of the symbol image corresponding to the right side underneath image is processed to be the right side transparent region which is fully transparent and the single display image includes the superposed right side underneath image and only an outline of the right side transparent region.

9. The display apparatus according to claim 2, wherein the region of the symbol image corresponding to the back side underneath image, the region of the symbol image corresponding to the left side underneath image, and the region of the symbol image corresponding to the right side underneath image are processed to be the back side transparent region, the left side transparent region, and the right side transparent region having a predetermined degree of transparency based on a travel operation lever of the dump truck.

* * * * *